United States Patent [19]

Sugaya et al.

[11] Patent Number: 5,561,744
[45] Date of Patent: Oct. 1, 1996

[54] OUTPUT METHOD AND APPARATUS USING THE SAME

[75] Inventors: Akio Sugaya, Yokohama; Kunio Okada, Kawasaki, both of Japan

[73] Assignee: Canon Kabushiki Kaisha, Tokyo, Japan

[21] Appl. No.: 480,291

[22] Filed: Jun. 7, 1995

Related U.S. Application Data

[63] Continuation of Ser. No. 282,173, Jul. 29, 1994, abandoned, which is a continuation of Ser. No. 849,158, Mar. 10, 1992, abandoned.

[30] Foreign Application Priority Data

Mar. 12, 1991 [JP] Japan ................................ 3-046365
Apr. 23, 1991 [JP] Japan ................................ 3-092300

[51] Int. Cl.$^6$ .................................................. G06K 15/00
[52] U.S. Cl. .................................................... 395/112
[58] Field of Search ................................. 395/112, 113, 395/114, 500; 358/445, 467, 470; 400/61–62, 67, 70–76

[56] References Cited

U.S. PATENT DOCUMENTS

| | | | |
|---|---|---|---|
| 4,754,428 | 6/1995 | Schultz et al. | 395/114 |
| 4,968,159 | 11/1990 | Sasaki et al. | 375/112 |
| 4,992,957 | 2/1991 | Aoyama et al. | 395/114 |
| 5,038,298 | 8/1991 | Matsumoto et al. | 364/518 |
| 5,075,874 | 12/1991 | Steeves et al. | 395/112 |
| 5,165,014 | 11/1992 | Vassar | 395/112 |
| 5,222,200 | 6/1993 | Callister et al. | 395/112 |

FOREIGN PATENT DOCUMENTS

| | | | |
|---|---|---|---|
| 332779 | 5/1988 | European Pat. Off. | G06K 15/00 |
| 469974 | 7/1991 | European Pat. Off. | G06F 3/12 |
| 92/04672 | 3/1992 | WIPO . | |

OTHER PUBLICATIONS

*Patent Abstracts of Japan*, vol. 14, No. 113 (Kokai 01-314177).

*Primary Examiner*—Arthur G. Evans
*Attorney, Agent, or Firm*—Fitzpatrick, Cella, Harper & Scinto

[57] ABSTRACT

An output apparatus such as a printer is controlled by a control program. A first control program is stored in a fixed storage medium, and a second control program having a different operation than the first control program is stored in a detachable storage medium. The two control programs are selectively used, based on data received from a host computer.

28 Claims, 11 Drawing Sheets

FIG. 2

CONTROL LANGUAGE 1

| | INSTRUCTION CODE | PROCESSING |
|---|---|---|
| 1 | 1B(hex) @ | INITIALIZE PRINTER APPARATUS |
| 2 | 1B(hex) M | SELECT FONT OF 12 CPI |
| 3 | 1B(hex) P | SELECT FONT OF 10 CPI |
| 4 | 1B(hex) C | SET PAGE LENGTH |
| ⋮ | ⋮ | ⋮ |

CONTROL LANGUAGE 2

| | INSTRUCTION CODE | PROCESSING |
|---|---|---|
| 1 | 1B(hex) C | INITIALIZE PRINTER APPARATUS |
| 2 | 9B(hex) P | DESIGNATE SHEET SIZE |
| 3 | 9B(hex) 0K | SELECT FONT OF 10 CPI |
| 4 | 9B(hex) 1K | SELECT FONT OF 12 CPI |
| ⋮ | ⋮ | ⋮ |

FIG. 9
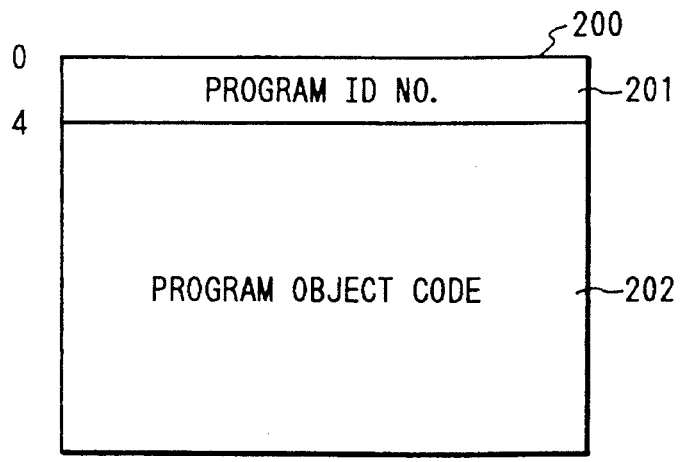
FIG. 10
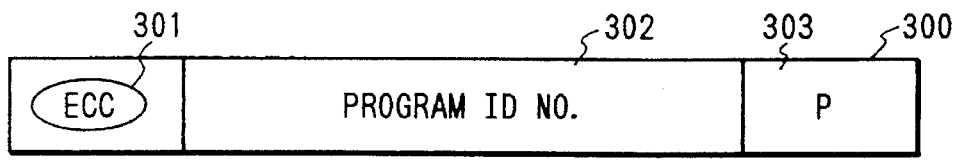
FIG. 11
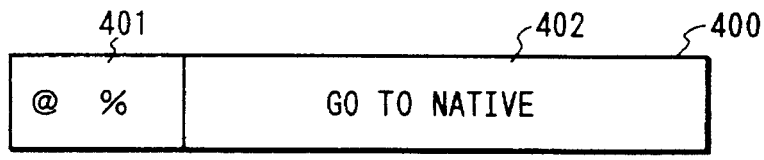
FIG. 12
| 501 | 502 | 503 | 500 |
|---|---|---|---|
| PROGRAM ID NO. 1 | $l_1$ | CODE TRAIN 1 | |
| PROGRAM ID NO. 2 | $l_2$ | CODE TRAIN 2 | |
| ⋮ | ⋮ | ⋮ | |
| PROGRAM ID NO. j | 10 | '@% GO TO NATIVE' | 504 |
| ⋮ | ⋮ | ⋮ | |

OUTPUT METHOD AND APPARATUS USING THE SAME

This application is a continuation of application Ser. No. 08/282,173, filed Jul. 29, 1994, now abandoned, which in turn, was a continuation of application Ser. No. 07/849,158, filed Mar. 10, 1992, now abandoned.

BACKGROUND OF THE INVENTION

1. Field of the Invention

The present invention relates to an output method and an apparatus using the same, wherein received data is determined to allow switching between different control languages.

2. Related Background Art

An output apparatus such as a printer apparatus (e.g., an ink-jet or laser beam printer) generally has a control instruction group (to be referred to hereinafter as a control language) for controlling the output apparatus. The output apparatus can draw characters and figures on the basis of the control language. Since different control languages have different instruction codes for recognizing instructions in accordance with different types of printer apparatus, a correct output character or figure cannot be obtained unless a control language suitable for a currently used printer apparatus is transmitted. For this reason, control languages used in other printer apparatus are installed as emulation languages in addition to the language assigned to each printer apparatus, so that a plurality of control languages can be interpreted.

In a printer apparatus installed with a plurality of control languages, a desired control language is manually selected at an operation panel or the like in the printer apparatus.

When an output apparatus for interpreting a plurality of these control languages is assumed, the output apparatus cannot automatically determine the control language of the received data. Even if the output apparatus can automatically determine the control language of the received data, its accuracy cannot be evaluated.

In a recent apparatus of this type, a detachable program storage medium is prepared in addition to an installed first control program, and a second control program having a different operation from that of the first control program is stored in the detachable program storage medium. Therefore, the first control program (i.e., the installed program) and the second control program can be selectively used.

Most of the second control programs are so-called emulation programs for determining data of a command system different from that of the first control program and executing the program. When such a second control program is used, all existing application programs on the host side which could not have previously used the recording apparatus can now use this recording apparatus by the use of the second control program without modifying the existing application programs. For example, a new high-performance type command system of the first control program and a conventional command system having poor performance can be used.

In the above conventional example, when recording and printing are to be performed on the basis of data suitable for the second command system supported by the second control program, a host computer sends a control program switching command to a recording apparatus in advance and then sends data of the second command system.

Assume that a storage medium which stores a third control program for supporting a third command system is attached against the will of an operator since the storage medium which stores the second control program is detachable. In this case, the command system supported by the control program stored in the detachable storage medium is inconsistent with the command system of print data sent from the host computer. As a result, a desired print cannot be obtained, resulting in inconvenience.

SUMMARY OF THE INVENTION

It is an object of the present invention, in consideration of the conventional problems described above, to provide an output method and an apparatus using the same, wherein a means for comparing a control language of received data with instruction codes of a main control language registered in the apparatus is arranged to automatically determine the control language of the received data.

It is another object of the present invention to provide an output method and an apparatus using the same, wherein codes represented by respective control languages and representing instructions having higher frequencies of occurrence are stored, data represented by a control language for controlling an output is input, the input data is compared with the stored codes, and the control languages are switched.

It is still another object of the present invention to provide an output method and an apparatus using the same, wherein instruction codes which are present in some control languages and are not present in other control languages are stored, data represented by a control language for controlling an output is input, the input data is compared with the stored codes, and the control languages are switched.

It is still another object of the present invention to provide an output method and an apparatus using the same, wherein data represented by a control language for controlling an output is input, the input data is interpreted on the basis of a first control language, and the input data is interpreted on the basis of the second control language if an instruction code which is not present in the first control language is present.

According to the present invention, there is provided a means for causing the second control instruction to interpret the received data from the beginning when the received data is interpreted by the first control language and an improper instruction is detected. Therefore, the control language of the received data can be automatically determined, and printing can be performed.

According to the present invention, there is provided a means for comparing received data with a specific instruction code (i.e., an instruction code present in one control language) unique to one control language registered in the apparatus so as to determine the control language of the received data. Therefore, the control language of the received data can be automatically determined.

The present invention has been made in consideration of the conventional techniques, and has as still another object to provide an image recording apparatus capable of signaling a failure to a user when the apparatus cannot transit to a designated control command system.

It is still another object of the present invention, in consideration of the conventional drawbacks described above, to provide an output method and an apparatus using the same, wherein a failure can be signaled to a user when a designating means designates command system switching to another command system and this designated command system is not installed in the apparatus.

BRIEF DESCRIPTION OF THE DRAWINGS

FIG. 2 is a diagram showing instruction codes registered in advance to determine control languages;

FIG. 9 is a diagram showing a data storage format in a program cartridge of the printer shown in FIG. 8;

FIG. 10 is a diagram showing a command format of a cartridge shift command in the printer shown in FIG. 8;

FIG. 11 is a diagram showing a command format of a main body shift command in the printer shown in FIG. 8;

FIG. 12 is a diagram showing a data structure of a main body shift command table in the printer shown in FIG. 8;

DETAILED DESCRIPTION OF THE PREFERRED EMBODIMENTS

Preferred embodiments of the present invention will be described in detail with reference to the accompanying drawings. Note that the present invention may be realized by a system comprising a plurality of equipments or a single equipment. In addition, the present invention is also realized by supplying programs to a system or apparatus.

Figure 4:
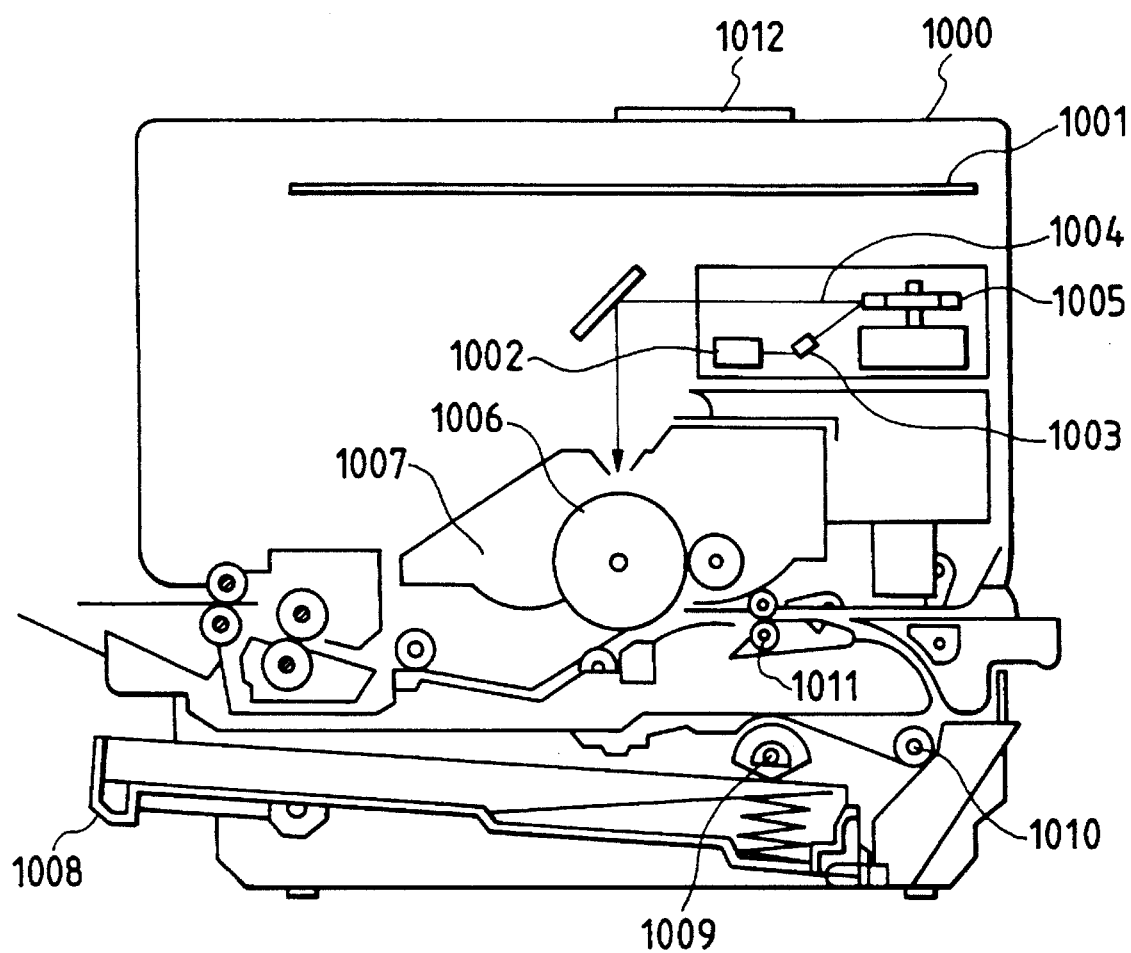
FIG. 4 is a sectional view of a laser beam printer.

FIG. 4 is a sectional view showing an internal structure of a laser beam printer (to be referred to hereinafter as an LBP) as an arrangement of an output apparatus according to an embodiment of the present invention.

Note that the output apparatus is not limited to the laser beam printer but can be replaced with a LED printer, an ink-jet printer, or the like. A character pattern and a format (form data) can be registered from a data source (not shown) to the LBP.

Referring to FIG. 4, an LBP main body (1—1 to 1–10 in FIG. 1) 1000 receives character information (character codes), form information, or a microinstruction from a host computer (1—1 in FIG. 1) connected to an external device. The LBP main body 1000 generates a character pattern and a form pattern corresponding to these pieces of input information and forms an image on a recording sheet serving as a recording medium. An operation panel 1012 has operation switches and LED indicators for indicating the operation selected by the operation switches. A printer control unit 1001 performs overall control of the LBP main body 1000 (1–10 in FIG. 1) and analyzes character information supplied from the host computer. The control unit 1001 mainly converts character information into a video signal representing a character pattern and outputs the video signal to a laser driver 1002.

The laser driver 1002 is a circuit for driving a semiconductor laser 1003. The laser driver 1002 ON/OFF-controls a laser beam 1004 emitted from the semiconductor laser 1003 in accordance with the input video signal. The laser beam 1004 is deflected by a rotary polygonal mirror 1005 to scan an electrostatic drum 1006, thereby forming an electrostatic latent image of a character pattern on the electrostatic drum 1006. This latent image is developed by a developing unit 1007 located around the electrostatic drum 1006 and is then transferred to the recording sheet. The recording sheet is a cut sheet. The cut sheets are stored in a sheet cassette 1008 attached to the LBP main body 1000. Each recording sheet is picked up and fed by a pickup roller 1009 and feed rollers 1010 and 1011 to the electrostatic drum 1006.

Figure 1:
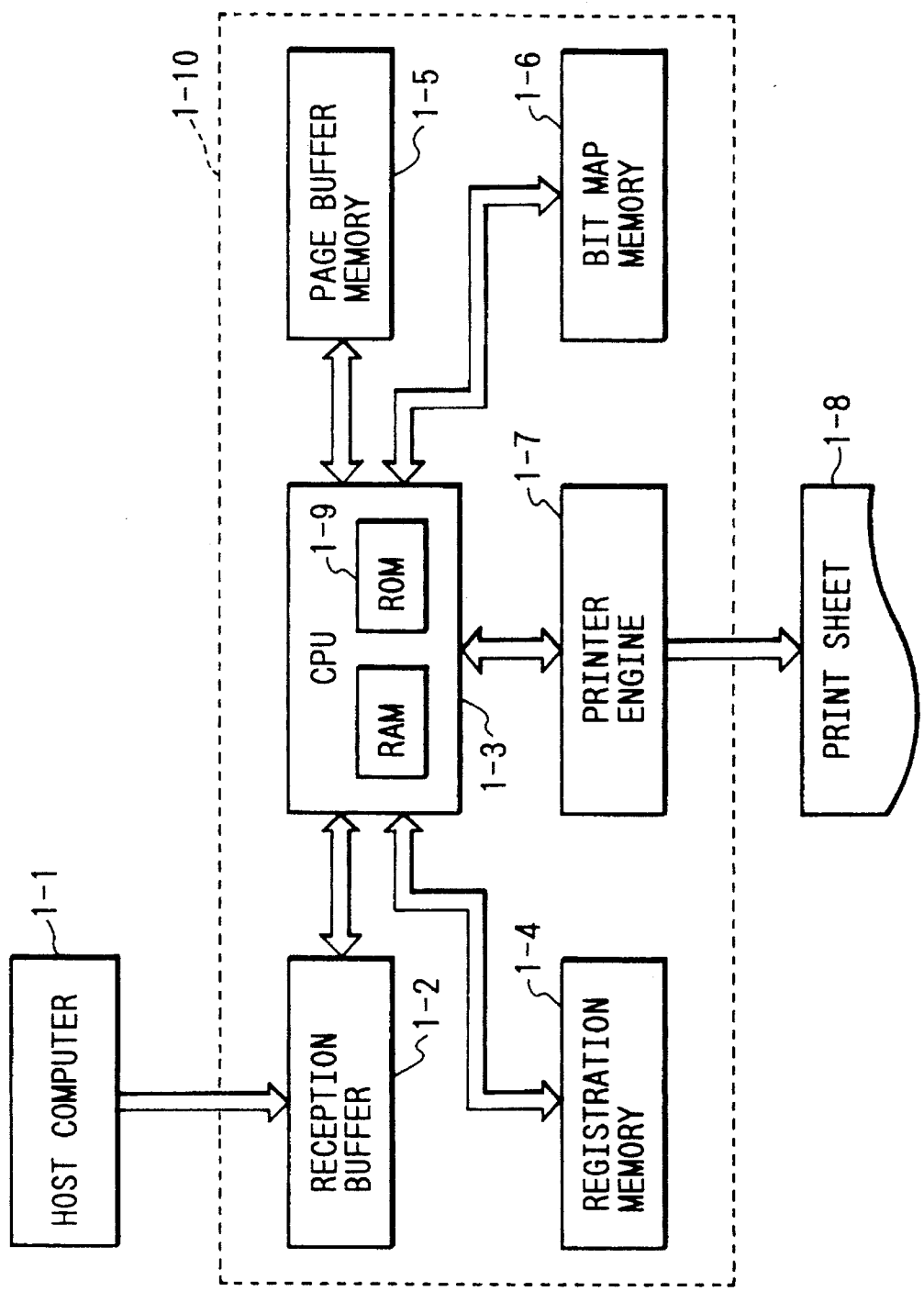
FIG. 1 is a block diagram showing an output apparatus according to an embodiment of the present invention.

FIG. 1 is a block diagram of a control unit for controlling the overall operation of the LBP. The control unit comprises a host computer 1—1 for performing data transfer, a reception buffer 1–2 for storing received data, a CPU 1–3 for controlling the LBP, a registration memory 1–4 for storing a plurality of instruction codes in units of control languages shown in FIG. 2, a page buffer 1–5 for storing received data in units of pages, a bit map memory 1–6 for storing a one-page output image, and a printer engine 1–7 for outputting data from the bit map memory 1–6 onto a print sheet. The recorded sheet is illustrated as an output sheet 1–8. This embodiment according to the present invention will be described in detail below.

[Automatic Switching Between Control Languages]

FIG. 2 shows instruction code systems of control languages registered in the registration memory 1–4. By designating each control language, a visible image such as a character or figure can be formed. A main code of each control language shown in FIG. 2 is compared with print data transmitted from the host computer 1—1 and stored in the reception buffer 1–2. The main code is an instruction code consisting of an instruction for initializing a printer apparatus, a sheet switching instruction, a font selection instruction, an image code (e.g., image drawing instruction) representing a possibility of the current capacity exceeding a buffering capacity. That is, instructions supposed to be received are represented by the respective control languages, and the control language of the received data is determined.

Figure 3:
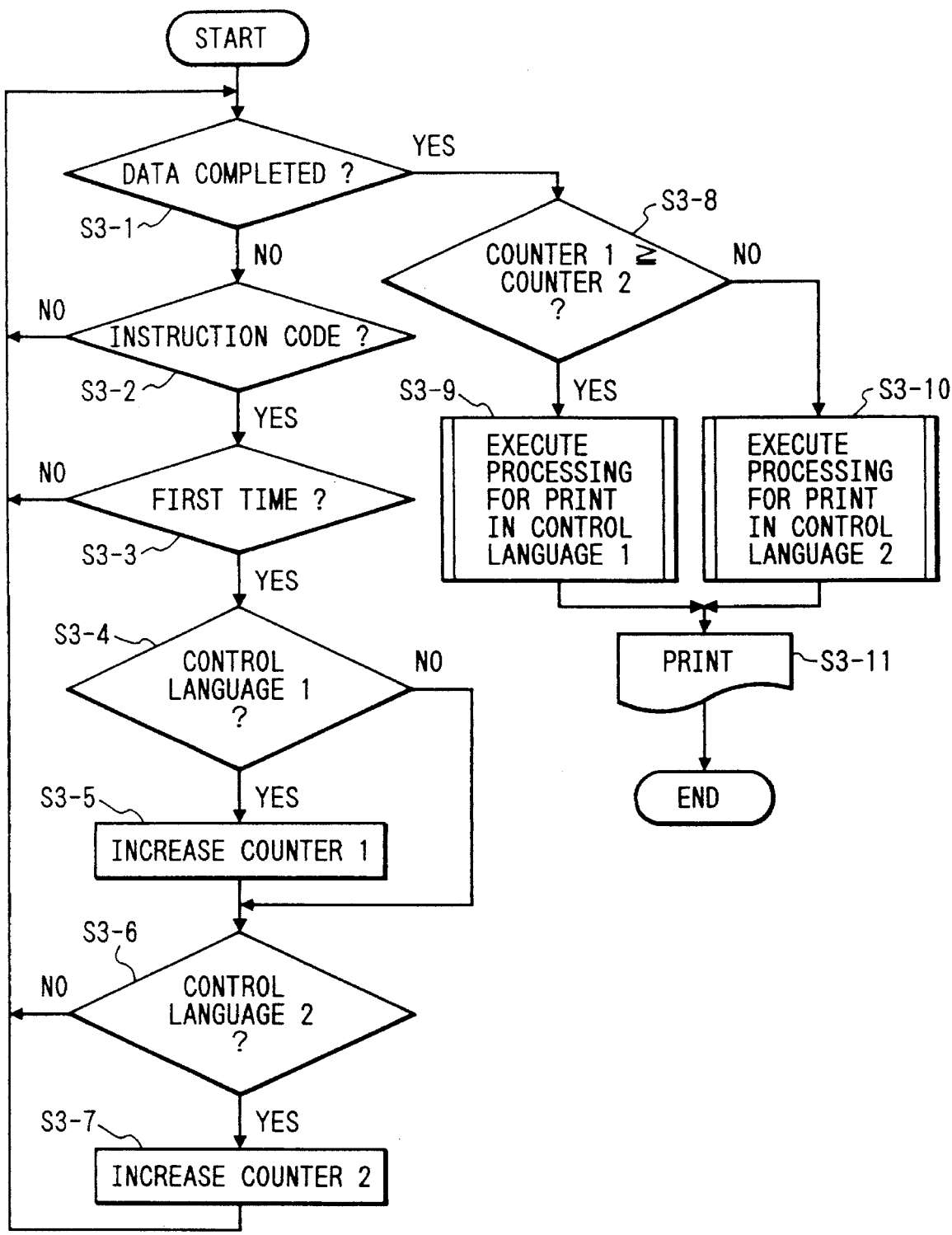
FIG. 3 is a flow chart for determining a control language by counting instruction codes appearing in received data.

FIG. 3 is a flow chart showing a program stored in a ROM 1–9 in the CPU 1–3 in FIG. 1. FIG. 3 shows processing for determining the control language of the received data. Prior to this processing, the received data is transferred from the host computer 1—1 and is buffered in the reception buffer 1–2.

It is determined in step S3-1 whether the print data buffered in the buffer memory 1–2 is completed. That is, is all of the print data buffered in buffer memory 1–2. If NO in step S3-1, data is loaded byte by byte in step S3-2 and is compared with the instruction codes of control languages 1 and 2 shown in FIG. 2. If any instruction code which is inconsistent with the input data is extracted, the flow returns to step S3-1. However, if an instruction code is extracted in step S3-2, it is determined in step S3—3 whether this instruction code is received for the first time. A flag for determining this is assumed to be set by an initialization instruction or a sheet discharge instruction. If NO in step S3—3, the flow returns to step S3-1. If this instruction code is determined be the instruction code received for the first time, i.e., any identical code is not previously received, and if it is determined in step S3-4 that an identical instruction code is registered in control language 1, counter 1 is incremented. Otherwise, if it is determined in step S3–6 that the instruction code is registered in control language 2 stored in the registration memory 1–4, counter 2 is incremented in step S3–7. If this instruction code is not registered, the flow returns to step S3-1. The above operations are repeated until it is determined in step S3-1 that all the buffered data are interpreted, and the count of counter 1 is compared with that of counter 2 in step S3–8. The control language having a larger count is as determined in S3–8 is designated as the control language of the received data. Print processing is performed using control language 1 in step S3–9 or control language 2 in step S3–10 in accordance with the designation. The print data is then printed in step S3–11. Note that all the data need not be interpreted, and that the above operations may be performed for a predetermined number of instructions. This applies to other embodiments less than a total number of instructions described below.

The instruction codes of the control languages shown in FIG. 2 need not be permanently assigned, but can be registered or modified. In addition, a means for deleting instruction codes which are rarely used on the basis of the received data and for replacing these instruction codes with frequently used instruction codes may be arranged. More specifically, soft counters are arranged in correspondence with the respective instruction codes to determine frequencies of occurrence of the respective instruction codes, so that a plurality of instruction codes having a high frequency of occurrence for each control language can be stored in the registration memory. Although a flow chart is omitted for non-permanently assigned instruction codes, in such a flow chart step S3—3 in FIG. 3 would be omitted, and values from steps S3–4 to S3–7 would be counted by the counters in units of instruction codes. Instructions to be stored in the registration memory 1–4 would be selected in accordance with the count values of the soft counters.

A specific control language is designated as the first control language as in the conventional arrangement. Thereafter, instruction codes having a higher frequency of occurrence would be stored in the registration memory.

The control instructions need not be checked until all the buffered data is determined to be completed in step S3-1. The flow may advance to step S3–8 when a given instruction code such as a sheet discharge code (HEX 0C) is detected. In this case, all the predetermined number of instruction codes need not be simply checked, but processing can be performed in units of instruction groups of the predetermined number of instruction codes.

(Another Embodiment)

In this embodiment, an instruction code stored in a registration memory 1–4 is present in either control language. That is, if a registered instruction code is extracted, the corresponding control language is set. Otherwise, another control language is set.

Figure 5:
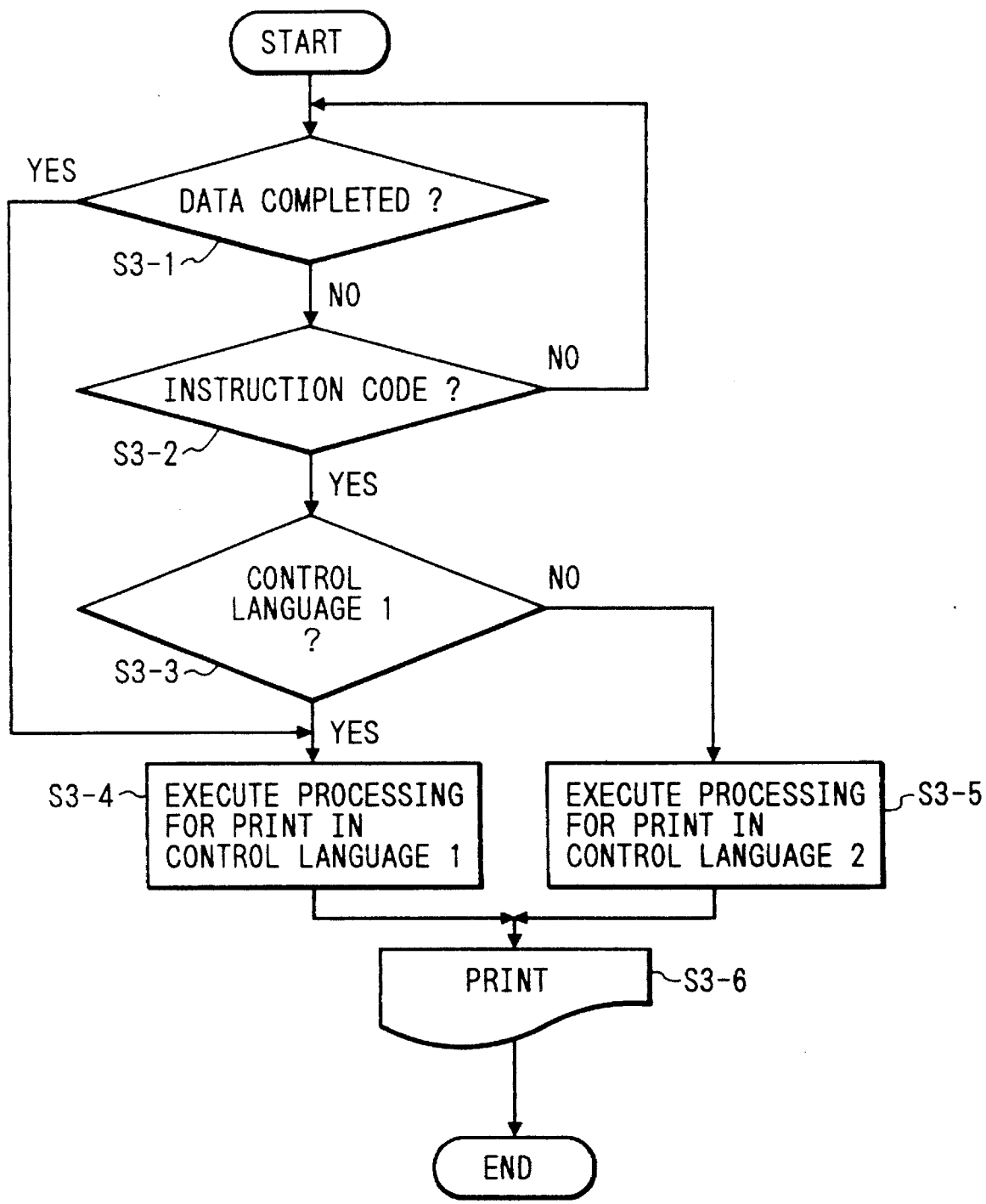
FIG. 5 is a flow chart for determining a control language by storing instruction codes respectively assigned to the control languages.

FIG. 5 is a flow chart for determining the control language of received data on the basis of instruction codes stored in the registration memory 1–4. Prior to this processing, the received data is transferred from a host computer 1—1 and is buffered in the reception buffer 1–2.

It is determined in step S3-1 whether all of the buffered print data is completed. If YES in step S3-1 and if the control language of the received data is not determined, the flow advances to step S3-4 to interpret and print the instruction code on the basis of control language 1. If NO in step S3-1, data is loaded byte by byte in step S3-2. The loaded data is compared with the instruction code of the registered control language 1 shown in FIG. 2. If no consistent instruction code is extracted, the flow returns to step S3-1. The flow then advances from step S3-1 to step S3-4. However, if an instruction code can be extracted in step S3-2, and if it is determined in step S3—3 that the instruction code is registered in control language 1, the instruction code is interpreted and subjected to print processing by control language 1 in step S3–4, thereby printing the data in step S3–6. However, if the instruction code is determined in step S3—3 to be included in any control language except for control language 1, i.e., control language 2, the instruction code is interpreted and subjected to print processing by control language 2 in step S35. The data is then printed in step S3–6.

(Still Another Embodiment)

A default for printing processing may be designated even if the control language is not determined in step S3-1.

The instruction code may be interpreted and subjected to print processing in accordance with the control language of the default even if a sheet discharge code (HEX 0C) is received in addition to the determination in step S3-1.

[Embodiment of Processing Starting with Control Language]

(Still Another Embodiment)

Figure 6:
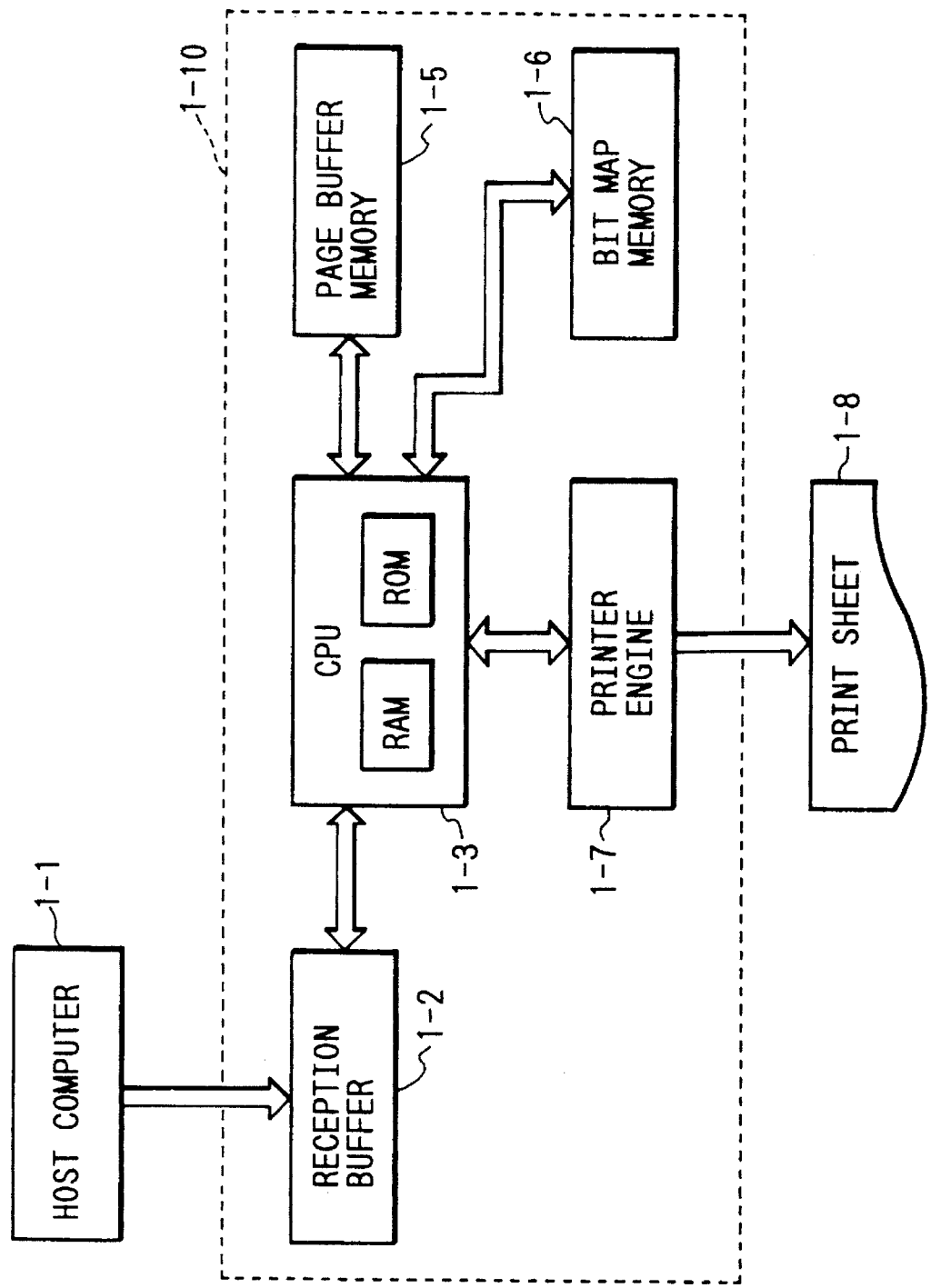
FIG. 6 is a block diagram showing an output apparatus according to another embodiment of the present invention.

FIG. 6 is a block diagram of a control unit for controlling an LBP for realizing this embodiment. In this embodiment, the registration memory (1–4 (FIG. 1) is not utilized, and processing of data stored in a page buffer memory 1–5 is started on the basis of control language 1. Referring to FIG. 6, the control unit comprises a host computer 1—1 for performing data transfer, a reception buffer 1–2 for storing received data, a CPU 1–3 for controlling the LBP, a page buffer memory 1–5 for storing received data in units of pages, a bit map memory 1–6 for storing a one-page output image, and a printer engine 1–7 for outputting data stored in the bit map memory 1–6 to a print sheet. The recorded sheet is illustrated as an output sheet 1–8.

Figure 7:
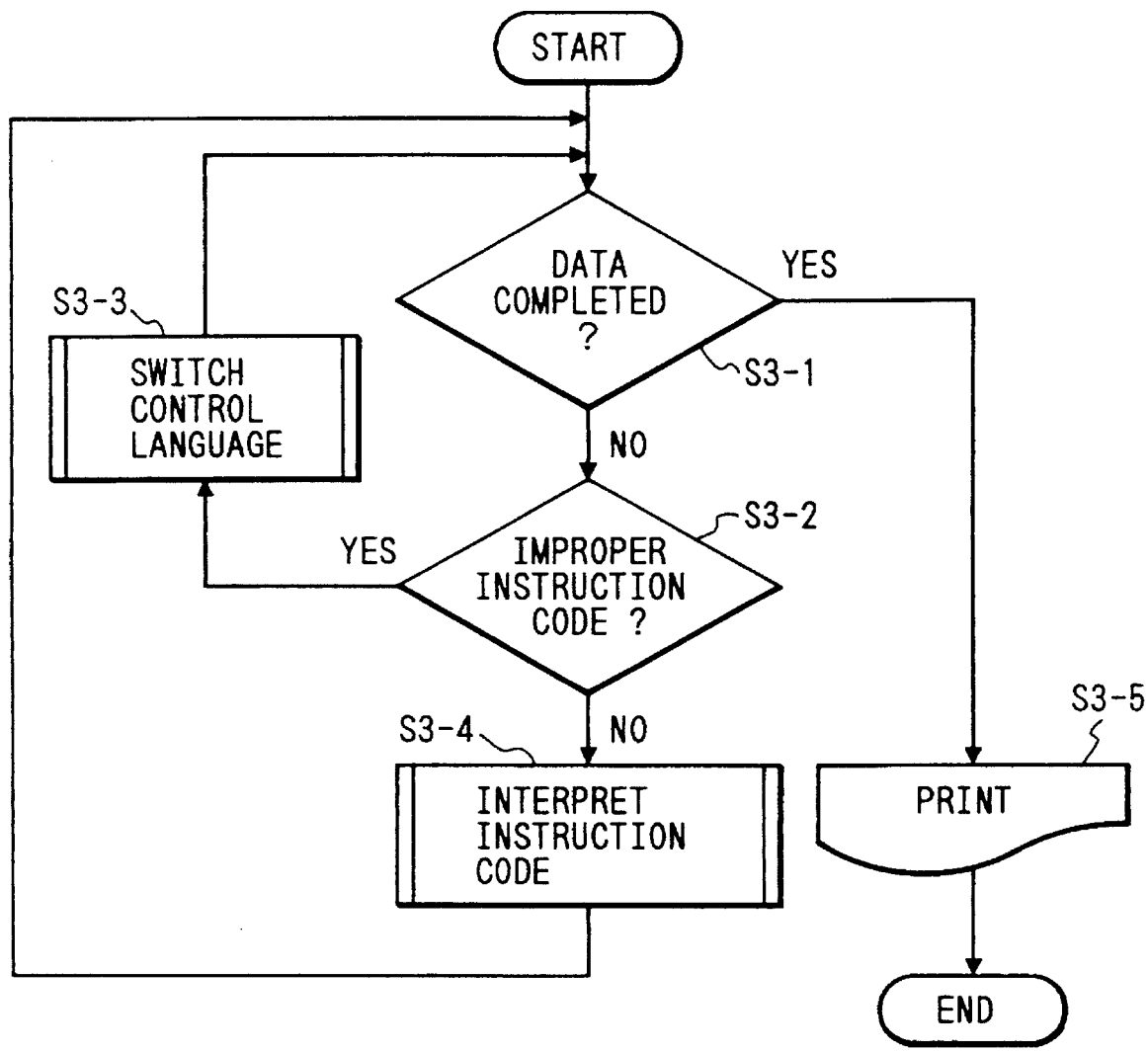
FIG. 7 is a flow chart for explaining switching between control languages in accordance with an input instruction code.

FIG. 7 is a flow chart of processing, for interpreting data stored in the page buffer memory 1–5 in order to print it. Prior to this processing, data is assumed to be transferred from the host computer 1—1 to the reception buffer 1–2.

It is determined in step S3-1 whether all buffered print data is completed. If NO in step S3-1, data is loaded byte by byte in step S3-2. The loaded data is compared with the instruction code of registered control language 1 shown in FIG. 2. If a consistent instruction code is present, i.e., if a proper instruction code for the registered control language 1 is present, the flow advances to step S3–4 to interpret the instruction code. The interpreted data is stored as image formation data in the bit map memory 1–6 and as buffered data in the page buffer 1–5. When this instruction processing is completed, the flow returns to step S3-1. However, if an improper instruction code which is not present in the currently interpreted control language is present in step S3-2, the instruction code stored in the page buffer 1–5, if any, is deleted in step S3—3, thereby restoring the print atmosphere set at the start of data interpretation. Thereafter, the interpreting control language is switched to start processing operations of steps S3-1 and S3-2 from the start of the received data stored in the reception buffer 1–2. As described above, the instruction is interpreted until the end of the data, and print processing is executed. When all the data is determined in step S3-1 to be interpreted, the data is read out from the page buffer 1–5, and a visible image is formed in the bit map memory 1–6. The visible image is transferred to the printer engine 1–7 and is printed thereat in step S3–5.

(Still Another Embodiment)

At the start of processing, a default of a control language to be compared for the first time may be designated at an operation panel or the like. Alternatively, the first control language may be selected from a previous history.

The control instructions need not be checked until all the buffered data is determined to be completed in step S3-1. The flow may advance to step S3-5 for printing when a sheet discharge code (HEX 0C) is detected.

In switching the control language in step S3—3, the input data may be compared with the instruction code tables of the respective control languages shown in FIG. 2. In this case, the control language is switched to the one having the consistent instruction code.

According to the present invention, the control language of the received data is automatically determined, and interpretation suitable for the selected control language is executed to obtain a desired character or graphic pattern. A printing means switching instruction and a control language switching instruction is issued at the time of printing and prior to control language switching, respectively. Therefore, the time and labor required to switch the control language is eliminated, thereby simplifying switching between the control languages.

As described in detail, according to the present invention, there is provided an output method and an apparatus using the same, wherein codes represented by respective control languages and representing instructions having higher frequencies of occurrence are stored, data represented by a control language for controlling an output is input, the input data is compared with the stored codes, and the control languages are switched.

As described above in detail, according to the present invention, there is provided an output method and an apparatus using the same, wherein instruction codes which are present in some control languages and are not present in some control languages are stored, data represented by a control language for controlling an output is input, the input data is compared with the stored codes, and the control languages are switched.

As described above in detail, according to the present invention, there is provided an output method and an apparatus using the same, wherein data represented by a control language for controlling an output is input, the input data is interpreted on the basis of a first control language, and the input data is interpreted on the basis of the second control language if an instruction code which is not present in the first control language is present.

[Still Another Embodiment: Signaling whether Output Is Possible]

An operation for signaling whether an output is possible when the current command system is to be switched to another command system will be described in detail.

This embodiment will be described in detail with reference to accompanying drawings and exemplifies a laser beam printer as an image recording apparatus.

Figure 8:
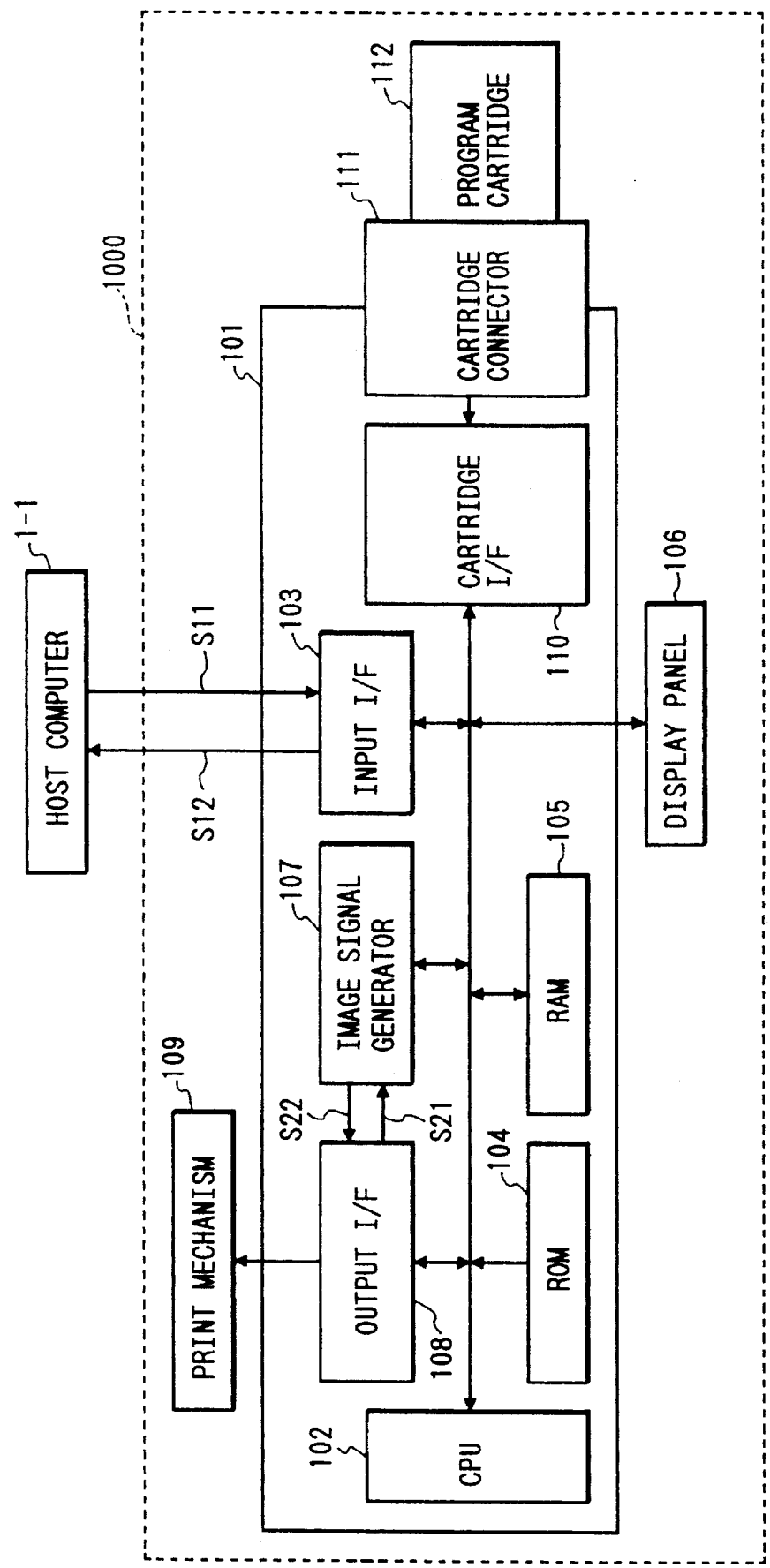
FIG. 8 is a block diagram of a laser beam printer according to still another embodiment of the present invention.

FIG. 8 is a block diagram of a laser beam printer according to this embodiment. A laser beam printer 1000 is connected to a host computer 1—1 serving as a recording data source.

The laser beam printer 1000 mainly comprises a print mechanism 109 and a print control unit 101 for receiving recording data from the host computer 1—1 and controlling the print mechanism 109. The print mechanism 109 receives an image signal to perform a series of laser beam printer operations such as supply of a recording sheet (recording medium), ON/OFF-control of a laser beam, transfer of an image to the sheet, and fixing of the transferred image. The print mechanism 109 is illustrated in FIG. 4 in detail, and a detailed description thereof will be omitted.

An arrangement of the print control unit 101 of the laser beam printer 1000 will be described below.

The print control unit 101 includes a CPU 102, an input I/F 103, a ROM 104, a RAM 105, a display panel 106, an image signal generator 107, an output I/F 108, a cartridge I/F 110, and a cartridge connector 111. The CPU 102 controls the overall operation of the laser beam printer. The input I/F 103 receives data from the host computer 1000 through an input signal line S1 and signals data reception to the CPU 102. Various status data of the laser beam printer are output from the input I/F 103 through an output signal line S12. The ROM 104 stores a first program (i.e., a program to be described later) shown in FIG. 13 and for realizing recording processing of the first printer command system, and control information, character dot patterns, and the like used by the first program. The RAM 105 is used by the control program as a work area of the control program and an image memory area as a one-page bit map image data area. The display panel 106 is comprised of general 7-segment LEDs and is used to indicate various operating states under control of the CPU 102. The image signal generator 107 converts the one-page bit map image data developed in the image memory area of the RAM 105 into an image signal. The image signal generator 107 outputs an image signal S22 to a print mechanism 109 in synchronism with a sync signal S21 from the print mechanism 109. The output I/F 108 performs input/output operations between the print control unit 101 and the print mechanism 109. The cartridge I/F 110 serves as an electrical interface between the program cartridge 112 and the control unit 100. The CPU 102 accesses the ROM in the program cartridge through the cartridge I/F 110 and senses the presence/absence of the program cartridge through the cartridge I/F 110. The program cartridge 112 is obtained by storing as a cartridge a ROM circuit board constituted by the ROM and its associated elements. The program cartridge 112 stores a second control program (i.e., a program for controlling the laser beam printer 1000 as in the first control program) having a printer command system (to be referred to as a second command system) different from that of the first control program stored in the ROM 104. A sequence of the second command system is shown as a flow chart in FIG. 14. This program cartridge 112 has a detachable structure through the cartridge connector 111 of the print control unit 101. The program cartridge 112 can be replaced with another program cartridge which stores a third control program.

The first control program stored in the ROM 104 is referred to as program A, and the control program stored in the program cartridge 112 is referred to as program Bi (i=1, 2, ... ).

Figure 14:
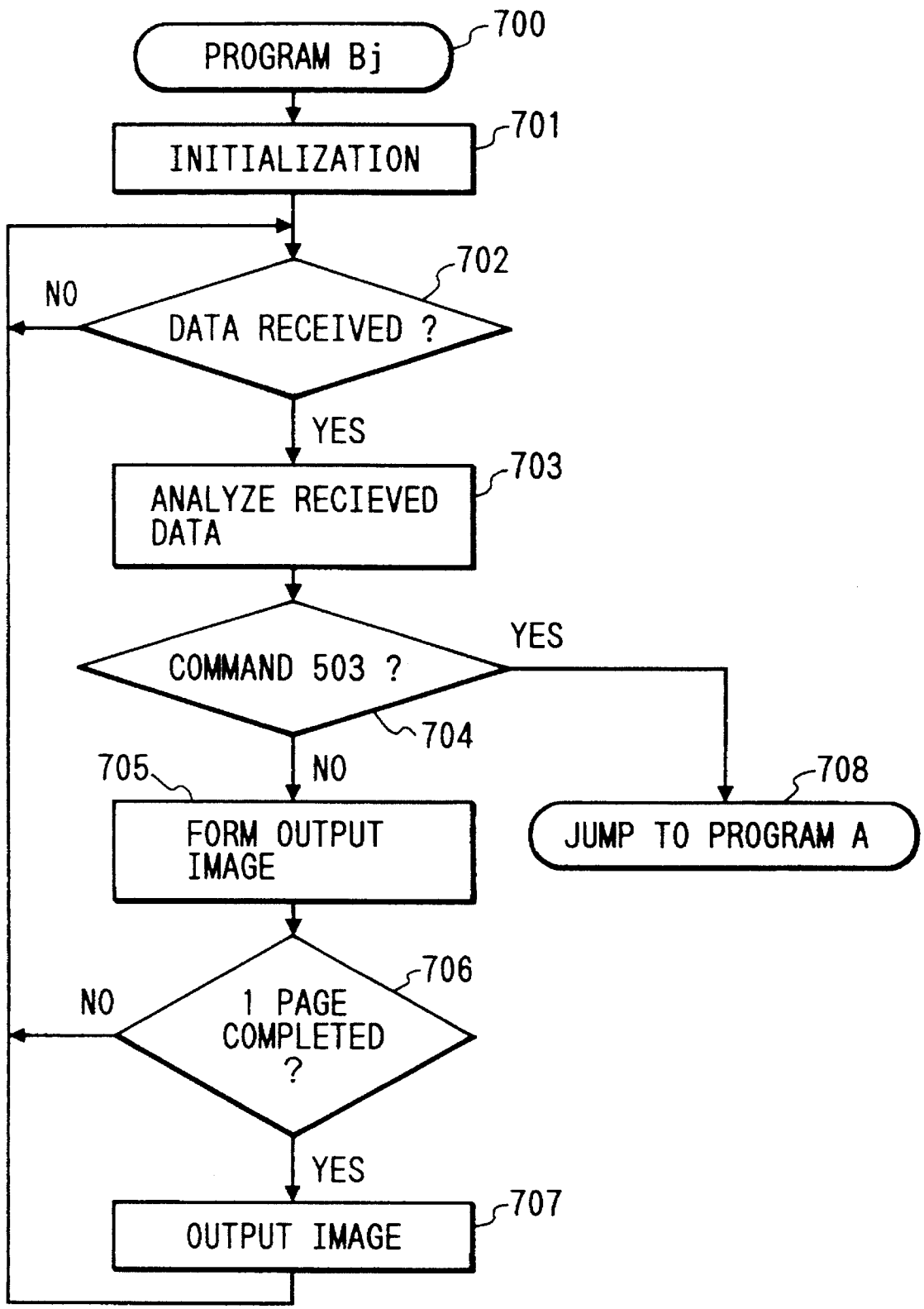
FIG. 14 is a flow chart of a program stored in a program cartridge.

FIG. 9 is a view showing a ROM storage format 200 of program Bi stored in the program cartridge 112. Referring to FIG. 9, the storage format 200 consists of a program ID area 201 for storing a program ID No. as a unique number in accordance with a type of control program stored in a 4-byte ROM area (addresses 0 to 3) from address 0, and a program area 202 for storing an object code of program Bi so that the program is started from address 4 of the ROM. Any program Bi can be stored in the program cartridge 12, and one program is shown in FIG. 14 (i.e., a program of this flow chart is defined as program Bj).

FIG. 10 shows a command format of one of the printer commands applied to program A stored in the ROM 104 to designate shift from program A to program Bi stored in the program cartridge 112.

This command format is of a so-called escape sequence command system and consists of a control ECC ($1B_H$ where H represents the hexadecimal notation) 301 representing the start of the command, a program ID No. 302 of program Bi to be shifted, and a command terminator "P" (also serving as a command ID name representing a shift command) 303.

When switching is to be performed from program A to program Bi stored in the program cartridge 112, the above command is transmitted from the host computer and is analyzed by program A, so that control transits to program Bi stored in the program cartridge 112.

The components 301 to 303 constitute a cartridge shift command 300.

FIG. 11 shows a command format of one of the printer commands applied to program Bj as an example of program Bi stored in the program cartridge 112. This command designates a shift of control from program Bj to program A stored in the ROM 104. Note that since a shift to program A stored in the ROM 104 of the main body is performed, this command is called a main body shift command.

This shift has the same function as a function of shifting program A to program Bi in FIG. 10. The command formats correspond to command systems stored in the program cartridges 112, respectively. In this embodiment, the command format is a text command format consisting of a character code train "@%" of an identifier for designating the start of the command and a command character string 402 following the character code train "GO TO NATIVE" for designating a shift to program A. When program Bj detects the main body shift command 400, its control transits to program A.

FIG. 12 shows a data structure of a main body shift command table 500 prepared in the ROM 104.

As described above, the plurality of program cartridges 112 are detachable from the laser beam printer. The main body shift command table 500 is used to cause the ROM 104 in the print control unit 100 to store the main body shift commands i of the command systems of programs Bi (i=1, 2, . . . ) stored in the respective program cartridges. This table consists of three elements, i.e., an ID No. area 501 for setting the program ID No. i program Bi in each program cartridge, a command length area 502 for setting a length li (the number of bytes) of the main body shift command, and a code area 503 for storing a code train of the main body shift command i. Sets each consisting of these three elements are prepared in number corresponding to the number of various program cartridges, thereby constituting the table 500. A set 504 consists of an ID No. area, a command length area, and a main body shift command of program Bj as one of programs Bi. 10 Switching control operations of program A as the control program on the main body in the laser beam printer and program Bj as the control program on the program cartridge side will be described with reference to flow charts in FIGS. 13 and 14, respectively.

Figure 13:
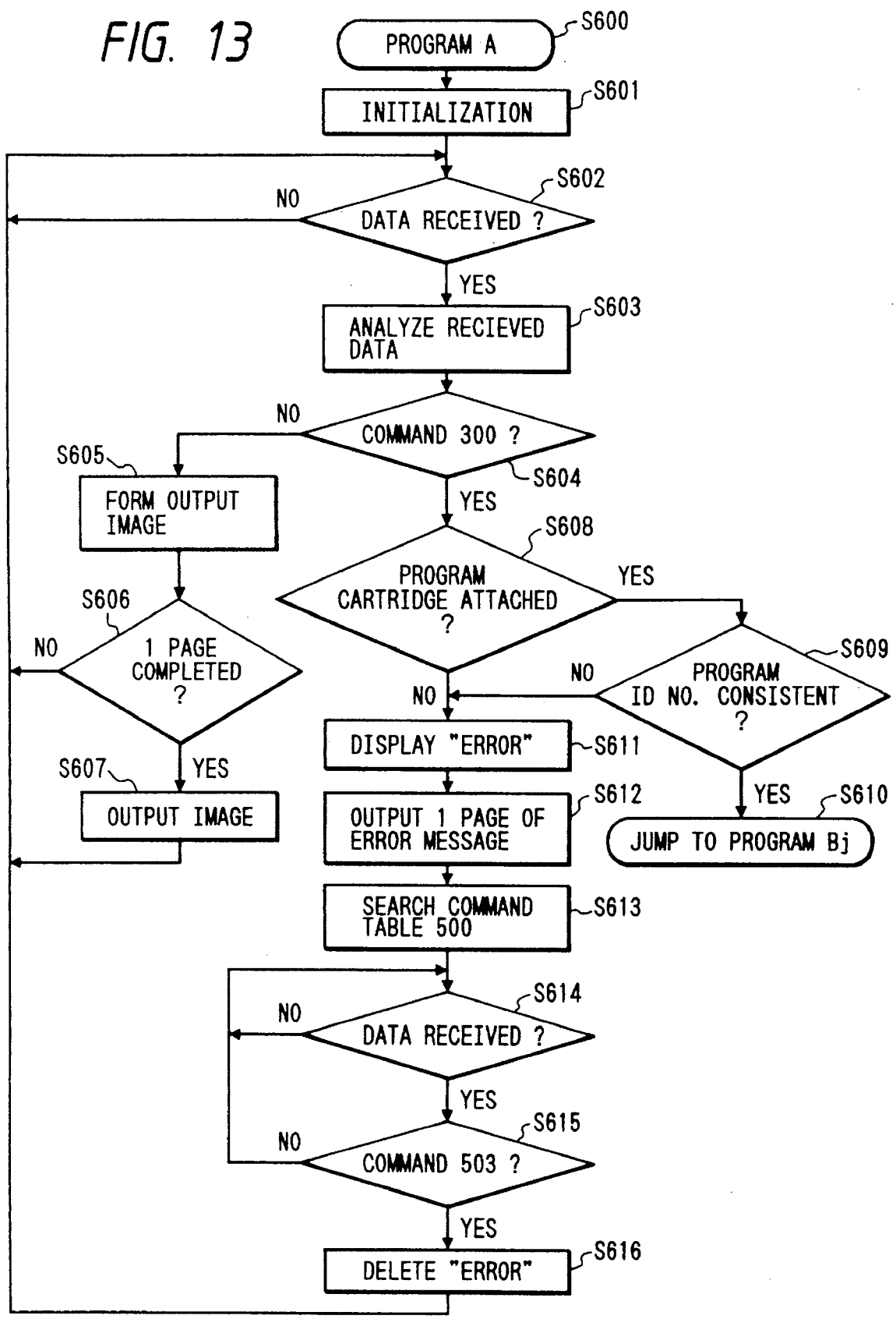
FIG. 13 is a flow chart of a program stored in the main body of the apparatus.

The operation of program A stored in the ROM 104 will be described first with reference to the flow chart in FIG. 13.

When the power switch of the laser beam printer is turned on, initialization processing of the program is started in step S601, and the input I/F 103 is checked in step S602. The laser beam printer waits for input data from the host computer 1000.

When data is received, the flow advances to step S603 to fetch input data from the input I/F, thereby executing data analysis. In this data analysis, it is determined if the input data is a command or a character code. If the input data is a command, that is it is consistent with the cartridge shift command 300 in FIG. 10, the flow is branched from step S604 and advances to step S608 to execute program switching processing. Otherwise, i.e., if the input data is determined to be a character code, the flow advances to step S605 to select a corresponding character dot pattern from the ROM 104. The selected character dot pattern is developed in an image memory area in the RAM 105 to form an output page image. The flow then advances to step S606, and operations in steps S602 to S606 are repeated until one-page of data analysis is completed. When one-page of image formation is completed, the flow advances to step S607 to send the complete image memory to the area of the RAM 105, and then to the image signal generator 107. The image signal generator 107 causes the print mechanism 109 to print the information. The flow then returns to step S602, and processing of the next page is started.

When the cartridge shift command 300 is detected in step S604, the flow advances to step S608 to determine whether a program cartridge is attached. If YES in step S608, it is checked in steps S609 whether the program ID No. 302 (FIG. 10) designated by the cartridge shift command 300 is consistent with the program ID No. set in the program ID area 201 (FIG. 9) in the program cartridge. If YES in step S609, the designated program Bi (Bj in this case) is present, and control jumps at step 610 to the start of the program area 202 in the program cartridge, and control transits to program Bj (i.e., step S701 (FIG. 14) to be described later).

When the program cartridge is determined in step S608 not to be attached to the laser beam printer, or when the program ID Nos. are inconsistent with each other in step S609, this indicates that program. Bi designated by the host computer is not present. Processing then advances to step S611 and subsequent steps.

An alarm mark as an error indication is displayed on the display panel 106 (FIG. 8) in step S611 to indicate a message representing the absence of the designated program Bj (an error code may be displayed). In step S612, a dot pattern of each character constituting the error message is read out from the ROM 104, and the readout data is developed in the image memory area. The developed data is sent to the image signal generator 107, thereby printing a one-page error message.

The host computer 1—1 (FIG. 8) sends a data group corresponding to program Bj after it sends the cartridge shift command. In step S613, a code train of the main shift command corresponding to the program ID No. 302 of the cartridge shift command 300 (FIG. 10) detected in step S602 is extracted from the code 503. In this embodiment, the table element 504 (FIG. 12) corresponding to program Bj is selected, and a code train "@% GO TO NATIVE" of the main body shift command is selected.

The laser beam printer waits for data from the host computer 1—1 in step S614 as in step S602. The received data is neglected until the received data is determined in step S615 as the previously extracted main body shift command.

When the code train of the corresponding main body shift command is detected, the host computer 1—1 sends data based on the command system corresponding to program A. Therefore, the alarm mark and the message on the display panel 106 are deleted in step S616, and the flow returns to step S602.

The processing contents of program Bj in the program cartridge 112 will be described with reference to the flow chart in FIG. 14. This processing is started upon reception of the cartridge shift command 300 during execution of program A in the ROM 104, as described with reference to FIG. 13.

Initialization processing as program Bj is executed in step S701. The current state of the print control unit 100 by program A is reset. In step S702, the laser beam printer waits for data from the host computer 1—1.

When data is received, the received data is analyzed in step S703. A command is discriminated from a character code in data analysis according to the command system supported by program Bj. If the input data is a command, that is it is consistent with the main body shift command 400, the flow is branched from step S704 to step S708, and control transits to program A (i.e., step S601) in the ROM 104.

When a command or character code for program Bj is detected, the flow advances to step S705, and a corresponding character pattern or the like is developed in the image memory area in the RAM 105. The operations in steps S702 to S706 are repeated as a one-page image is prepared in step S706. When the one-page image is completed, the flow advances to step S707, and the completed image information is sent to the image signal generator 107. The one-page image is the printed. The flow then returns to step S702, and processing of the next page is continued.

As described above, according to this embodiment, when the designated second control program is not present, an alarm mark or message can be displayed on the display panel because the absence of the designated second control program is signaled to the user.

Since an error message representing the absence of the designated control program is output, the presence of a recording sheet on which the error message is printed indicates that nonprinted subsequent data are present. Therefore, if the laser beam printer has a timer backed up by a battery and current time is printed together with an error message, the user can know the subsequent nonprinted data set from the time when the error message is displayed, regardless of the length of time elapsed.

In this embodiment, when the control program of the program ID No. designated by the cartridge shift command is absent, the alarm mark and the message are displayed on the display panel, and the error message is printed. However, the present invention is not limited to this embodiment.

For example, the presence/absence of the designated control program may be informed provided to the host computer through the output signal line S12. In this case instance, the host computer transmits the cartridge shift command and waits for a response signal from the printer. The host computer then transmits print data corresponding to the desired control program. If the designated control program is not present, transmission of the print data can be interrupted. Therefore, the printer need not neglect the received data, and wasteful data transmission is prevented.

This embodiment exemplifies the laser beam printer. However, the present invention is not limited to such a printer to be within the spirit and scope of the invention. The present invention is equally applicable to an ink-jet printer for causing a change in volume of an ink by heat energy and ejecting an ink from an orifice.

In the above embodiment, only one program cartridge is attached to the cartridge connector 111. However, if a plurality of connectors are used, the present invention is applicable to a plurality of command systems. At this time, in order to switch the command system from each program cartridge to the command system of another program cartridge, tables having numbers corresponding to combinations of the command systems are prepared in addition to the command table for switching the program from each program Bi to program A. For example, in step S613 of FIG. 13, character trains of commands which allow shift from the designated program Bj are extracted. It is determined in step S615 whether the input data is consistent with one of the character trains. If any command is consistent with the input data, the corresponding command system is set.

As has been described in detail, according to the present invention, when the output apparatus cannot be set in the designated control command system, the user can easily determine the error.

At this time, a message representing the absence of the designated control command system is printed and recorded. At the same time, if the output apparatus keeps neglecting all received data until a command indicating that the designated command system can be set, unnecessary printing and recording need not be performed. At the same, nonprinted data can be determined.

What is claimed is:

1. An output apparatus in which an output operation can be executed using either one of a plurality of control programs each interpreting a control code represented by a control language, said apparatus comprising:

input means for receiving a control code;

determining means for determining whether a control program for interpreting the received control code exists in the plurality of control programs; and control means for skipping over the control code received by said input means until a prescribed command is received in the event that the control program for interpreting the received control code does not exist in said apparatus, and for interpreting the control code received by said input means in the event that the control program exists in said apparatus.

2. An output apparatus according to claim 1, wherein each of the control programs is written in a page description language.

3. An output apparatus according to claim 1, further comprising a display device which displays the determination result.

4. An output apparatus according to claim 1, further comprising output means for outputting the determination result to a host computer.

5. A method of operating an output apparatus in which an output operation can be executed using either one of a plurality of control programs each interpreting a control code represented by a control language, said method comprising:

a receiving step of receiving a control code;

a determining step of determining whether a control program for interpreting the received control code exists in the plurality of control programs; and a control step of skipping over the control code received by said receiving step until a prescribed command is received in the event that the control program for interpreting the received control code does not exist in the apparatus, and of interpreting the control code received by said receiving step in the event that the control program exists in the apparatus.

6. The method according to claim 5, wherein each of the control programs is written in a page description language.

7. The method according to claim 5, further comprising a step of displaying the determination result on a display device.

8. The method according to claim 5, wherein said output step outputs the determination result to a host computer.

9. An apparatus according to claim 1, wherein the prescribed command indicates a shift from the designated control program to one of the plurality of control programs which is different from the designated control program.

10. An apparatus according to claim 1, wherein after the prescribed command is received, said control means executes one of the plurality of control programs indicated by the received prescribed command to interpret a control code received by said input means and to generate a bit map image.

11. An apparatus according to claim 1, further comprising print means for printing a bit map image generated by interpreting a control code received by said input means.

12. A method according to claim 5, wherein the prescribed command indicates a shift from the designated control program to one of the plurality of control programs which is different from the designated control program.

13. A method according to claim 5, wherein after the prescribed command is received, said control step executes one of the plurality of control programs indicated by the received prescribed command to interpret a control code received by said receiving step and to generate a bit map image.

14. An apparatus according to claim 5, further comprising a print step for printing a bit map image generated by interpreting a control code received by said receiving step.

15. A memory medium used in an output apparatus in which an output operation can be executed using either one of a plurality of control programs each interpreting a control code represented by a control language, said memory medium comprising means for storing a program comprising processes of:

receiving a control code;

determining whether a control program for interpreting the received control code exists in the plurality of control programs; and skipping over the control code received in said receiving process until a prescribed command is received in the event that the control program for interpreting the received control code does not exist in the apparatus, and interpreting the control code received in said receiving process in the event that the control program exists in the apparatus.

16. A memory medium according to claim 15, wherein each of the control programs is written in a page description language.

17. A memory medium according to claim 15, wherein the program further comprises a process of displaying the determination result on a display device.

18. A memory medium according to claim 15, wherein the program further comprises a process of outputting the determination result to a host computer.

19. A memory medium according to claim 15, wherein the prescribed command indicates a shift from the designated control program to one of the plurality of control programs which is different from the designated control program.

20. A memory medium according to claim 15, wherein after the prescribed command is received, said skipping process executes one of the plurality of control programs indicated by the received prescribed command to interpret a control code received in said receiving process and to generate a bit map image.

21. A memory medium according to claim 15, wherein the program further comprises a process of printing a bit image generated by interpreting a control code received in said receiving process.

22. An output apparatus in which an output operation can be executed using either one of a plurality of control programs each interpreting a control code represented by a control language, said apparatus comprising:

a receiver for receiving a control code;

a determiner for determining whether a control program for interpreting the received control code exists in the plurality of control programs; and a controller for skipping over the control code received by said receiver until a prescribed command is received in the event that the control program for interpreting the received control code does not exist in said apparatus, and for interpreting the control code received by said receiver in the event that the control program exists in said apparatus.

23. An output apparatus according to claim 22, wherein each of the control programs is written in a page description language.

24. An output apparatus according to claim 22, further comprising a display device which displays the determination result.

25. An output apparatus according to claim 22, further comprising an output device for outputting the determination result to a host computer.

26. An output apparatus according to claim 2, wherein the prescribed command indicates a shift from the designated control program to one of the plurality of control programs which is different from the designated control program.

27. An output apparatus according to claim 22, wherein after the prescribed command is received, said controller executes one of the plurality of control programs indicated by the received prescribed command to interpret a control code received by said receiver and to generate a bit map image.

28. An output apparatus according to claim 22, further comprising a printer for printing a bit image generated by interpreting a control code received by said receiver.

* * * * *

UNITED STATES PATENT AND TRADEMARK OFFICE
CERTIFICATE OF CORRECTION

PATENT NO. : 5,561,744

DATED : October 1, 1996

INVENTOR(S) : AKIO SUGAYA ET AL.

It is certified that error appears in the above-identified patent and that said Letters Patent is hereby corrected as shown below:

COLUMN 2

Line 59, "transit" should read --transmit--.

COLUMN 4

Line 4, "OFF-controls" should read --OFF controls--;
Line 64, "determined be" should read --determined to be--.

COLUMN 5

Line 9, delete "is" (1st occurrence);
Line 30, "non-permanentally" should read --non-permanently--.

COLUMN 6

Line 10, "step S35." should read --step S3-5.--;
Line 23, "(1-4" should read --1-4--.

UNITED STATES PATENT AND TRADEMARK OFFICE
CERTIFICATE OF CORRECTION

PATENT NO. : 5,561,744

DATED : October 1, 1996

INVENTOR(S) : AKIO SUGAYA ET AL.

It is certified that error appears in the above-identified patent and that said Letters Patent is hereby corrected as shown below:

COLUMN 7

Line 32, "languages-are" should read --languages are--;
Line 62, "OFF-control" should read --OFF control--.

COLUMN 8

Line 7, "S1" should read --S11--;
Line 10, "later) shown in FIG. 13 and for" should read --later and shown in FIG. 13) for--.

COLUMN 9

Line 32, "commands i" should read --commands $\underline{i}$--;
Line 35, "No. i" should read --No. $\underline{i}$--;
Line 39, "command i." should read --command $\underline{i}$--;
Line 44, Delete "10".

COLUMN 10

Line 2, "one-page" should read --one page--;
Line 3, "one-page" should read --one page--;

UNITED STATES PATENT AND TRADEMARK OFFICE
CERTIFICATE OF CORRECTION

PATENT NO. : 5,561,744

DATED : October 1, 1996

INVENTOR(S) : AKIO SUGAYA ET AL.

It is certified that error appears in the above-identified patent and that said Letters Patent is hereby corrected as shown below:

COLUMN 10

Line 5, "memory to the" should read --to the memory--;
  Line 12, "steps S609" should read --step S609--;
  Line 23, "program. Bi" should read --program Bi--.

COLUMN 11

Line 11, "the" (1st occurrence) should read --then--;
  Line 16, "because" should read --signalling--;
  Line 35, Delete "case".

COLUMN 12

Line 33, "either one" should read --one--.

COLUMN 13

Line 15, "either one" should read --one--.

UNITED STATES PATENT AND TRADEMARK OFFICE
CERTIFICATE OF CORRECTION

PATENT NO. : 5,561,744

DATED : October 1, 1996

INVENTOR(S) : AKIO SUGAYA ET AL.

It is certified that error appears in the above-identified patent and that said Letters Patent is hereby corrected as shown below:

COLUMN 14

Line 9, "either one" should read --one--.

Signed and Sealed this

Twenty-second Day of April, 1997

Attest:

BRUCE LEHMAN

Attesting Officer

Commissioner of Patents and Trademarks